(12) United States Patent
Chapman et al.

(10) Patent No.: US 10,044,607 B2
(45) Date of Patent: Aug. 7, 2018

(54) COMMUNICATION WITH SEGMENT ROUTING IN A CABLE MODEM NETWORK ENVIRONMENT

(71) Applicant: CISCO TECHNOLOGY, INC., San Jose, CA (US)

(72) Inventors: John T. Chapman, Coto de Caza, CA (US); Carlos M. Pignataro, Raleigh, NC (US); Alon Bernstein, Monte Sereno, CA (US); Stefano B. Previdi, Rome (IT)

(73) Assignee: Cisco Technology, Inc., San Jose, CA (US)

( * ) Notice: Subject to any disclaimer, the term of this patent is extended or adjusted under 35 U.S.C. 154(b) by 157 days.

(21) Appl. No.: 15/096,746

(22) Filed: Apr. 12, 2016

(65) Prior Publication Data
US 2016/0366052 A1    Dec. 15, 2016

Related U.S. Application Data

(60) Provisional application No. 62/173,170, filed on Jun. 9, 2015.

(51) Int. Cl.
*H04L 12/723* (2013.01)
*H04L 12/721* (2013.01)
*H04L 29/06* (2006.01)

(52) U.S. Cl.
CPC .............. *H04L 45/50* (2013.01); *H04L 45/66* (2013.01); *H04L 65/1013* (2013.01)

(58) Field of Classification Search
CPC ...... H04L 45/50; H04L 65/1013; H04L 45/66
See application file for complete search history.

(56) References Cited

U.S. PATENT DOCUMENTS

2013/0070765 A1\*  3/2013  Chapman ............ H04L 12/2801
                                                         370/390
2013/0250935 A1    9/2013  Asati et al.

\* cited by examiner

*Primary Examiner* — Jackie Zuniga Abad
(74) *Attorney, Agent, or Firm* — Merchant & Gould P.C

(57) ABSTRACT

A system and method for facilitating communication with segment routing in a cable modem network environment may be provided. A pseudowire (PW) control packet including segment routing information including a PW segment identifier (SID) for establishing a data session between the RPD and a network element over a packet switched network is received at a remote physical device (RPD). The PW SID may be indicative of a segment in the packet switched network to be used for communicating PW data packets of the data session. The PW control packet and the PW data packets being are emulations of a point-to-point connection between the RPD and the network element. A mapping between the PW SID and the data session is written into a segment table of the RPD.

20 Claims, 6 Drawing Sheets

COMMUNICATION WITH SEGMENT ROUTING IN A CABLE MODEM NETWORK ENVIRONMENT

CROSS-REFERENCE TO RELATED APPLICATION

This application claims the benefit of priority under 35 U.S.C. § 119(e) to U.S. Provisional Patent Application Ser. No. 62/173,170, filed on Jun. 9, 2015 and entitled DOWNSTREAM EXTERNAL PHYSICAL (PHY) INTERFACE (DEPI) WITH SEGMENT ROUTING OVER MULTI-PROTOCOL LABEL SWITCHING (MPLS) AND INTERNET PROTOCOL VERSION 6 (IPv6), the disclosure of which is hereby incorporated by reference in its entirety.

TECHNICAL FIELD

This disclosure relates in general to the field of communications and, more particularly, to communication with segment routing in a cable modem network environment.

BACKGROUND

Driven by market evolution towards triple-play services, cable operators in emerging markets are seeking standardized and digital fiber-based solutions for economical and future proof access technologies. Much of the demand is driven by the need to provide higher bandwidth packet transport for Internet connectivity, video and voice services. Data Over Cable Service Interface Specification (DOCSIS) is an international telecommunications standard that has evolved to permit addition of high-bandwidth data transfer to an existing cable TV (CATV) system utilizing Quadrature Amplitude Modulation (QAM) and/or Quadrature phase-shift keying (QPSK) Radio Frequency (RF) modulation. It is employed by many cable television operators to provide Internet access over their existing hybrid fiber-coaxial (HFC) infrastructure. Traditionally, the DOCSIS system is a Point-to-Multipoint communications system, the corresponding standards defining Media Access Control (MAC)/PHY standards associated with providing high speed data over a hybrid fiber coaxial (HFC) network and is not naturally applicable for digital fiber. However, Cisco® remote-PHY (R-PHY) technology bridges the gap, for example, by allowing the optical part of the HFC plant to be digital as well as to separate the PHY components from the CCAP and locate them at the edge of the fiber plant.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example system and method for facilitating communication with segment routing in a cable modem network environment is provided and includes receiving, at a remote physical device (RPD) in a network, a pseudowire (PW) control packet including segment routing information with a PW segment identifier (PW SID) for establishing a data session between the RPD and a network element over a packet switched network, the PW SID indicative of a segment in the packet switched network to be used for communicating PW data packets of the data session, the PW control packet and the PW data packets respectively carrying control information and data, and comprising emulations of a point-to-point connection over the packet switched network between the RPD and the network element, and writing into a segment table of the RPD a mapping between the PW SID and the data session. In specific embodiments, the network element is a Converged Cable Access Platform (CCAP) Core of a cable network.

In a general sense, "control information" comprises information for controlling data forwarding functions, including network routing paths, protocols, routing states, vendor and platform specific stacking, clustering, pairing and other such information; "data" refers to any type of numeric, voice, video, or script data, or any other suitable information in any appropriate format that may be communicated over the network as transit traffic in data sessions. Data and control information are mutually exclusive types of information; for example, control information facilitates setting up network routes for forwarding data.

EXAMPLE EMBODIMENTS

Figure 1:
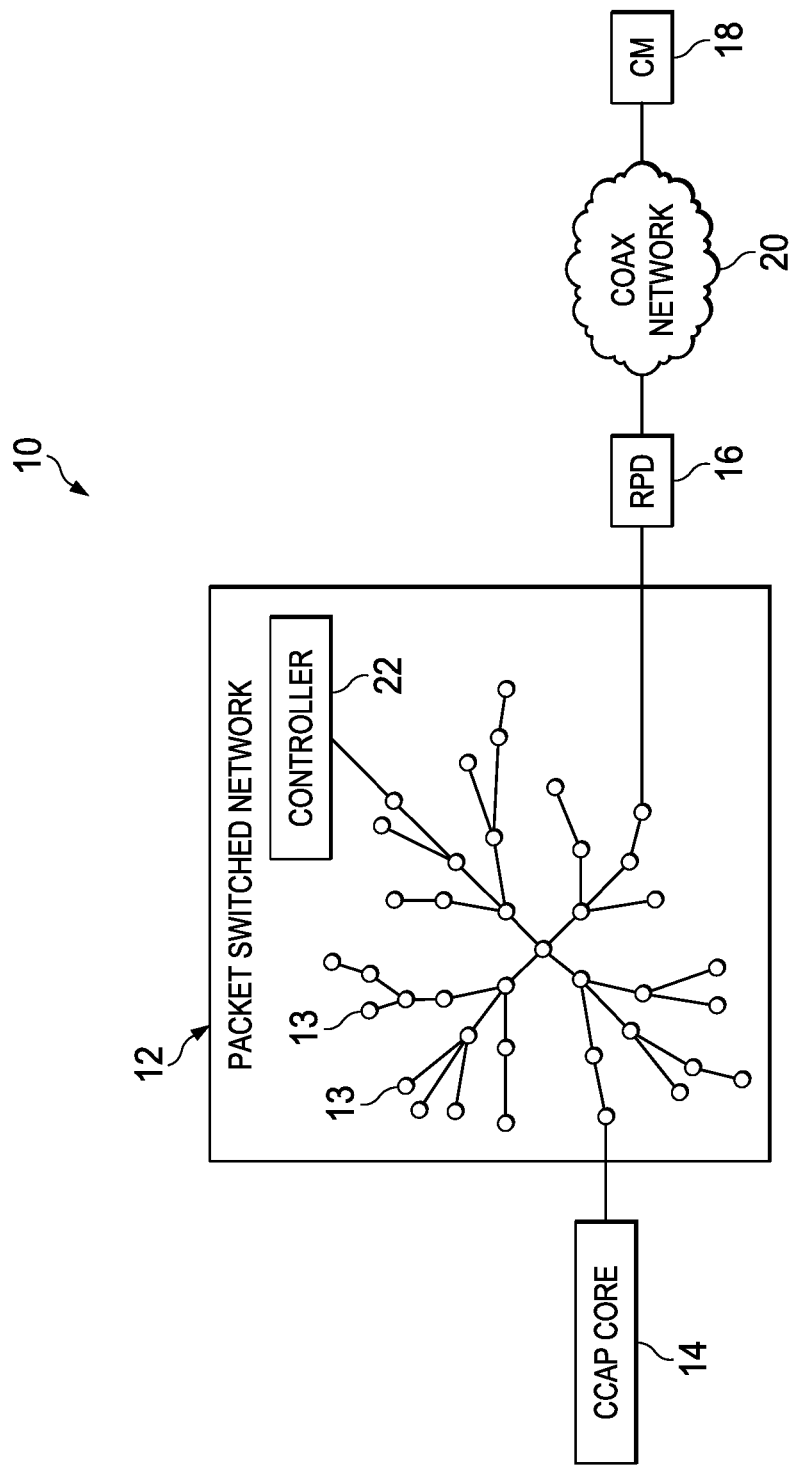
FIG. 1 is a simplified block diagram illustrating a communication system for communication with segment routing in a cable modem network environment.

Turning to FIG. 1, FIG. 1 is a simplified block diagram illustrating a communication system 10 for communication with segment routing in accordance with one example embodiment. Communication system 10 includes a packet switched network 12, including a plurality of switches (and routers) 13 facilitating communication between a Converged Cable Access Platform (CCAP)-Core 14 and a remote physical device (RPD) 16. RPD 16 communicates with one or more cable modem (CM) 18 over a hybrid fiber-coaxial (HFC) network 20. A controller 22 in network 12 communicates with RPD 16, providing certain network control plane functions according to embodiments of communication system 10. In various embodiments, packet switched network 12 implements a label switched architecture running Segment Routing (SR).

CCAP-Core 14 and RPD 16 together comprise a combination of a DOCSIS cable modem termination system (CMTS) and an edge QAM (EQAM). Media Access Control (MAC) and higher-layer functions of the CMTS are located in CCAP-Core 14, for example, including signaling functions, downstream bandwidth scheduling and DOCSIS framing. RPD 16 includes QAM modulators to connect to CM 18 over HFC network 20. RPD 16 has network (e.g., Ethernet) interfaces on one side (e.g., connected to network 12) and RF interfaces on the other side (e.g., connected to HFC network 20). RPD 16 provides Layer 1 physical (PHY) conversion, Layer 2 MAC conversion, and Layer 3 pseudowire support.

CCAP-Core 14 and RPD 16 communicate over an interface supporting an Internet Protocol (IP) tunnel through network 12. The IP tunnel includes a data path for DOCSIS frames and control path for setting up, maintaining, and tearing down sessions between CCAP-Core 14 and RPD 16. Communication between RPD 16 and CCAP-Core 14 is facilitated through downstream external physical interface (DEPI) and Upstream External Physical Interface (UEPI). DEPI and UEPI are IP-based PW packets inserted between a DOCSIS MAC in CCAP-Core 14 and a DOCSIS PHY in RPD 16. UEPI is an extension to DEPI. UEPI uses the same control plane structure and a unique set of encapsulations in the upstream direction. DEPI facilitates transporting DOCSIS data (e.g., DOCSIS frames or video packets (e.g., Moving Picture Experts Group (MPEG) packets)) formatted as PW packets through network 12 in the form of Layer 2 or Layer 3 packets. Specifically, DOCSIS data destined to CM 18 is communicated through network 12 using DEPI PW packets. In other words, DEPI operates to take either of the formatted DOCSIS frames, transport them through a Layer 2 or Layer 3 network, and deliver them to RPD 16 for transmission to CM 18. UEPI operates in the reverse direction, to take DOCSIS frames that have been received at RPD 16 and demodulated by the DOCSIS upstream PHY in RPD 16 and transport them to CCAP-Core 14 for processing. RPD 16 does not provide any upstream DOCSIS processing.

In a general sense, the PW is a mechanism to transparently transport a Layer 2 protocol over a Layer 3 network. RFC 3955 defines the PW as an emulation of a point-to-point connection over a packet switched network. The PW allows the packet switched IP network to carry a service without the service having to know details of the IP network; in other words, one transport is encapsulated in another transport, similar to an IP tunnel (however, a tunnel may contain one or more PWs). To build generic PW packets, a service is required for the PW to connect, and an underlying protocol is required for transporting the PW packet. Examples of underlying protocols are IP (e.g., for simple tunnels that do not require session setup), Multiprotocol Label Switching (MPLS) (e.g., for MPLS networks) and Layer 2 Tunneling Protocol Version 3 (L2TPv3) (e.g., for IP networks with session setup).

L2TPv3 is the generic protocol used for creating DEPI/UEPI PW packets, which can be transported over MPLS or IPv6 networks. In various embodiments, a Remote PHY PW module at CCAP-Core 14 facilitates setting up the PW channel (e.g., path) between CCAP-Core 14 and RPD 16 for communicating the DEPI PW packets over network 12. A Packet Streaming Protocol (PSP) module at CCAP-Core 14 generates the DEPI PW packets. In a general sense, the PSP module encapsulates a continuous stream of DOCSIS frames into a DEPI payload of the DEPI PW packets.

The DEPI is associated with a DEPI control plane and a separate DEPI data plane. The DEPI control plane performs the following functions: session set up and tear down (e.g., for transports that require session setup); PW set up and tear down (e.g., per channel); and reliable message delivery. The DEPI data plane performs data forwarding functions (e.g., forwarding DOCSIS frames encapsulated suitably for transport over network 12).

Turning to UEPI, UEPI builds upon the DEPI PW concepts and uses a variation of the PSP encapsulation. The UEPI control plane is the same as the DEPI control plane; the UEPI data plane is generally compatible with the DEPI data plane with some modifications that are outside the scope of this Specification. Moreover, UEPI and DEPI PW packet formats are identical to the extent relevant to the disclosure of this Specification. Hence, wherever DEPI PW packets are referred to in this Specification, it may be noted that the description is equally applicable to UEPI PW packets without departing from the scope of the embodiments. In other words, the PW packets described in this Specification comprise DEPI PW packets, and/or UEPI PW packets.

In various embodiments, the PW packet format is modified to accommodate SR. In a general sense, SR leverages a source routing paradigm, in which a node steers a packet through an ordered list of instructions, called segments (e.g., a segment can represent any instruction, topological or service-based; a segment can have a local semantic to a node or have a global definition within an SR domain). SR allows enforcement of a flow through any topological path and service chain while maintaining per-flow state only at the ingress node to the SR domain.

SR may be implemented in MPLS networks or IPv6 networks suitably. SR is directly applied to the MPLS architecture with no change on the forwarding (data) plane. The segment is encoded as an MPLS label, with an ordered list of segments being encoded as a stack of labels. The segment to process is on the top of the stack. Upon completion of processing the segment, the related label is decapsulated from the label stack. SR is applied to the IPv6 architecture with a new type of routing header. The segment is encoded as an IPv6 address, with an ordered list of segments being encoded as an ordered list of IPv6 addresses in the routing header. The segment to process is indicated by a destination address of the packet. The next segment to process is indicated by a pointer in the routing header.

In a general sense, the segment is identified by a segment identifier (PW SID), which may comprise an MPLS label in MPLS networks and IPV6 address, in IP networks. Typically, the PW SIDs are advertised using interior gateway protocol (IGP) or border gateway protocol (BGP) extensions, such as Open Shortest Path First (OSPF) and Intermediate System to Intermediate System (IS-IS) protocols. Segment types can comprise Node Segment, and Adjacency Segment.

In such SR enabled networks, RPD 16 cannot recognize or generate SR enabled packets because it does not have the requisite hardware (e.g., application specific integrated circuits, network processors, etc.) for SR processing. However, according to embodiments of communication system 10, a new type of segment, namely, PW Segment is defined that binds forwarding behavior of PW packets to an attachment circuit (e.g., type of L2-specific sublayer). The PW Segment includes instructions to map a DEPI or UEPI session identifier to the attachment circuit. Accordingly, RPD 16 can seamlessly run DEPI over L2TPv3 directly over Segment Routing, for both MPLS and IPv6. Such SR enabled functionality can facilitate various benefits, including application-based service creation, stateless-ness, resiliency (FRR), network simplification and higher link utilization in network 12 for PW packets.

In some embodiments, CCAP-Core 14 and/or controller 22 configures RPD 16 using appropriate configuration parameters in control messages to allow RPD 16 to identify SR information and format PW packets accordingly. In an example embodiment, CCAP-Core 14 configures RPD 16 using Generic Control Plane (GCP) protocol. GCP allows control plane data structures from other protocols to be tunneled through its generic control plane. For example, GCP can directly use DOCSIS type-lengths-values (TLVs) for the configuration of RPD PHY parameters. Such configuration information can include segment routing information for various radio frequency (RF) parameters (e.g., DOCSIS profiles, QAM channels, etc.). Note that the DEPI and UEPI protocols also contain a certain amount of configuration information. In some embodiments, the DEPI and UEPI is focused on session signaling, including segment routing information, and GCP is used for RPD-specific configuration and operation.

Communication system 10 is configured to address (among others) issues pertaining to communication over packet switched network 12 in a cable modem network environment. Accordingly, RPD 16 receives, over packet switched network 12, a PW control packet comprising segment routing information including a PW segment identifier (PW SID) for establishing a data session between RPD 16 and a network element, such as CCAP-Core 14 over packet switched network 12. As used herein, the term 'network element' is meant to encompass components of a network, including a cable network, with components such as CMTS, CCAP-Core 14, and cable modem 18, any of which may be implemented as computers, network appliances, servers, routers, switches, gateways, bridges, load-balancers, firewalls, processors, modules, or any other suitable device, component, element, or object operable to exchange information according to DOCSIS standards. Moreover, the network elements may include any suitably configured hardware provisioned with suitable software, components, modules, interfaces, or objects that facilitate the operations thereof. This may be inclusive of appropriate algorithms and communication protocols that allow for the effective exchange of data or information.

The PW SID received at RPD 16 is indicative of a segment in packet switched network 12 to be used for communicating PW data packets of the data session. RPD 16 writes into a segment table therein a mapping between the PW SID and the data session. Note that in various embodiments, the data session is associated with particular radio frequency parameters for communication between RPD 16 and cable modem 18, with the mapping (written into the segment table) associating the particular radio frequency parameters and the PW SID.

RPD 16 receives data from another network element, such as cable modem 18, over another network, such as HFC network 20, the data being associated with the data session between RPD 16 and CCAP-Core 14. RPD 16 looks up the segment table for the PW SID using information identifying the data session, generates a PW data packet, comprising a segment routing header having the PW SID, and transmitting the PW data packet over packet switched network 12 to CCAP-Core 14.

In some embodiments, RPD 16 receives a PW data packet from CCAP-Core 14, the PW data packet having the PW SID information in a segment routing header of the PW data packet, the PW data packet including a payload with data destined to cable modem 18. RPD 16 decapsulates the PW data packet, looks up the segment table using the PW SID for the data session, generates radio frequency signals having the data according to radio frequency parameters of the data session, and transmits the radio frequency signals over coaxial (HFC) network 20 to cable modem 18.

In various embodiments, the segment routing information is provided in an attribute value pair (AVP) portion of a header of the PW control packet. Note that if IPv6 protocol is used for communication in packet switched network 12, the PW SID comprises a destination IPv6 address identifying the segment. If MPLS protocol is used for communication in packet switched network 12, wherein the PW SID comprises a MPLS label stack identifying the segment. The PW control packet comprises a specific combination of a DEPI header and a L2TPv3 header, the PW SID associating the specific combination with the MPLS label stack. The segment routing information can include another PW SID associated with a tunnel between RPD 16 and CCAP-Core 14, with multiple data sessions per tunnel. Note that the segment routing information is distributed to RPD 16 without IGP and BGP. Rather, the segment routing information is distributed to RPD 16 according to DEPI over L2TPv3.

Turning to the infrastructure of communication system, the cable modem network can include any number of cable modems, customer premises equipment, servers, switches (including distributed virtual switches), routers, and other nodes inter-connected to form a large and complex network that supports cable modem protocols such as DOCSIS. In particular, the cable modem network comprises cable modems distributed in various geographic locations, communicatively coupled over radio frequency communication to one or more RPD 16, which in turn communicates with CCAP-Core 14.

In a general sense, the network also represents a series of points or nodes of interconnected communication paths for receiving and transmitting packets and/or frames of information that are delivered to the communication system. A node may be any electronic device, computer, printer, hard disk drive, client, server, peer, service, application, or other object capable of sending, receiving, or forwarding information over communications channels in a network. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs.

The network offers a communicative interface between cable modem network components, and may include any local area network (LAN), wireless local area network (WLAN), metropolitan area network (MAN), Intranet, Internet, Extranet, wide area network (WAN), virtual private network (VPN), or any other appropriate architecture or system that facilitates communications in a network environment. Network 12 may implement any suitable communication protocol for transmitting and receiving PW data packets within the communication system. The architecture of the present disclosure may include a configuration capable of TCP/IP, TDMA, and/or other communications for the electronic transmission or reception information in a network. The architecture of the present disclosure may also operate in conjunction with any suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of the communication system. It should be understood that the communication system shown in FIG. 1 is simplified for ease of illustration.

In some embodiments, a communication link may represent any electronic link supporting a network environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

In particular embodiments, RPD 16 may comprise suitable hardware components and interfaces for facilitating the operations described herein. In some embodiments, RPD 16 may be embedded in or be part of another hardware component, such as a broadband processing engine (comprising a motherboard, microprocessors and other hardware components). In some embodiments, RPD 16 includes downstream and upstream PHY components, deployed in a Coaxial Media Converter (CMC) that supports RF functions at the PHY layer. In particular embodiments, CCAP-Core 14 may comprise a hardware appliance with appropriate ports, processors, memory elements, interfaces, and other electrical and electronic components that facilitate the functions described herein.

RDP 16 includes hardware and software providing network functions on the MAC layer and PHY layer. The PHY layer is responsible for receiving and transmitting RF signals. Hardware portions of the PHY layer includes at least one upstream PHY and/or at least one downstream PHY. The PHY layer also includes software for driving the hardware components of the PHY layer. In a general sense, upstream optical data signals arriving via optical fiber over coaxial network 20 are converted to electrical signals and then demodulated by the upstream PHY at RPD 16. The demodulated information is then passed to the MAC layer.

On the downstream side, PW packets arriving over packet switched network 12 are transmitted by the MAC to the downstream PHY. At the downstream PHY, the data in the packets are converted into modulated downstream RF frames using, for example, QAM64 modulation. Other methods of modulation may also be used such as, for example, QAM256 modulation, CDMA (Code Division Multiple Access), OFDM (Orthogonal Frequency Division Multiplexing), FSK (FREQ Shift Keying), etc. The modulated data is converted from intermediate frequency (IF) electrical signals to radio frequency (RF) electrical signals (or vice-versa) using one or more electrical signal converters in RPD 16.

The MAC layer includes both a MAC hardware portion and a MAC software portion for upstream MAC and downstream MAC. The MAC layer hardware and software portions operate together to provide the DOCSIS MAC functionality. The MAC layer encapsulates, with MAC headers, downstream packets at the downstream MAC and decapsulates the MAC headers of upstream packets at the upstream MAC. The MAC headers include addresses to specific cable modem(s) 18 (if sent downstream), or to CCAP-Core 14 (if sent upstream).

CCAP-Core 14 comprises hardware and software for enabling network routing, DOCSIS packet forwarding and other network functions of the CMTS. For example, the hardware and software modules in CCAP-Core 14 includes a routing module, a forwarding module, a Data Over Cable Service Interface Specification (DOCSIS) control module, and one or more line cards. The routing module and the DOCSIS control module form part of a control plane, whereas the forwarding module and the line cards form part of a data plane. The routing module implements routing or forwarding operations in the control plane and the forwarding module provides packet-forwarding operations in the data plane. Additionally, in some embodiments, CCAP-Core 14 also includes a utility component adapted to provide a system clock and a timestamp functionality. The routing module may provide layer one, layer two, layer three, and layer four functionality, as well as quality of service (QoS) functionality.

CCAP-Core 14 may include functionalities found in a typical router, for example, Cisco's uBR Universal Broadband Router, with a network routing operating system. The routing module is configured to construct and load routing tables used by the forwarding module in CCAP-Core 14 and RPD 16. The routing module performs configuration management functions, such as distributing the PW SID information, and communicates with neighboring peer, standby, and/or backup routers to exchange protocol data units used to construct the routing tables applicable in packet switched network 12 in accordance with routing algorithms. The DOCSIS control module sends timing and frequency requirements to RPD 16 in suitable Media Access Protocol (MAP) messages using DEPI over L2TPV3.

In various embodiments, controller 22 comprises an application executing in a network element (e.g., server, router, switch, etc.) of network 12. In some embodiments, controller 22 uses suitable protocols, such as OpenFlow, to configure RPD 16 appropriately. Typically, controller 22 includes a collection of "pluggable" software modules that can perform different network tasks, such as inventorying what devices are within network 12 and the capabilities of each, gathering network statistics, etc. Extensions can be inserted that enhance the functionality and support more advanced capabilities, such as running algorithms to perform analytics and orchestrating new rules throughout network 12. Controller 22 includes an extension for generating control packets according to DEPI/UEPI over L2TPv3 protocols with SR information and communicating the control packets to RPD 16.

In a general sense, DOCSIS 3.1, CCAP-Core 14, and RPD 16 changes the physical infrastructure of typical cable networks having centralized MAC and PHY functions (e.g., at a CMTS device). SDN and network function virtualization (NFV) virtual infrastructure together with DOCSIS 3.1, CCAP-Core 14, and RPD 16 can enable cable operators to provide more flexible services and deliver services more quickly while also reducing capital expenditure and operating costs. According to embodiments of communication system 10, many of the components used to construct and support base service functions of network 12 may continue to execute in dedicated platforms outside the NFV environment. In the cable operator network this could include elements such as the routing and switching infrastructure, CCAP-Core platforms, and the Remote-PHY equipment. Components associated with service and management functions are migrated from dedicated servers and platforms toward the NFV environment. This includes network control elements (Dynamic Host Configuration Protocol (DHCP), packet cable multimedia (CMM), SR information, and so on) and appliances (firewall, deep packet inspection (DPI), and Network Address Translation (NAT)). In various embodiments, controller 22 determines the segments to be used for various data sessions between CCAP-Core 14 and RPD 16, and communicates the segment routing information in appropriate control packets to RPD 16.

Figure 2:
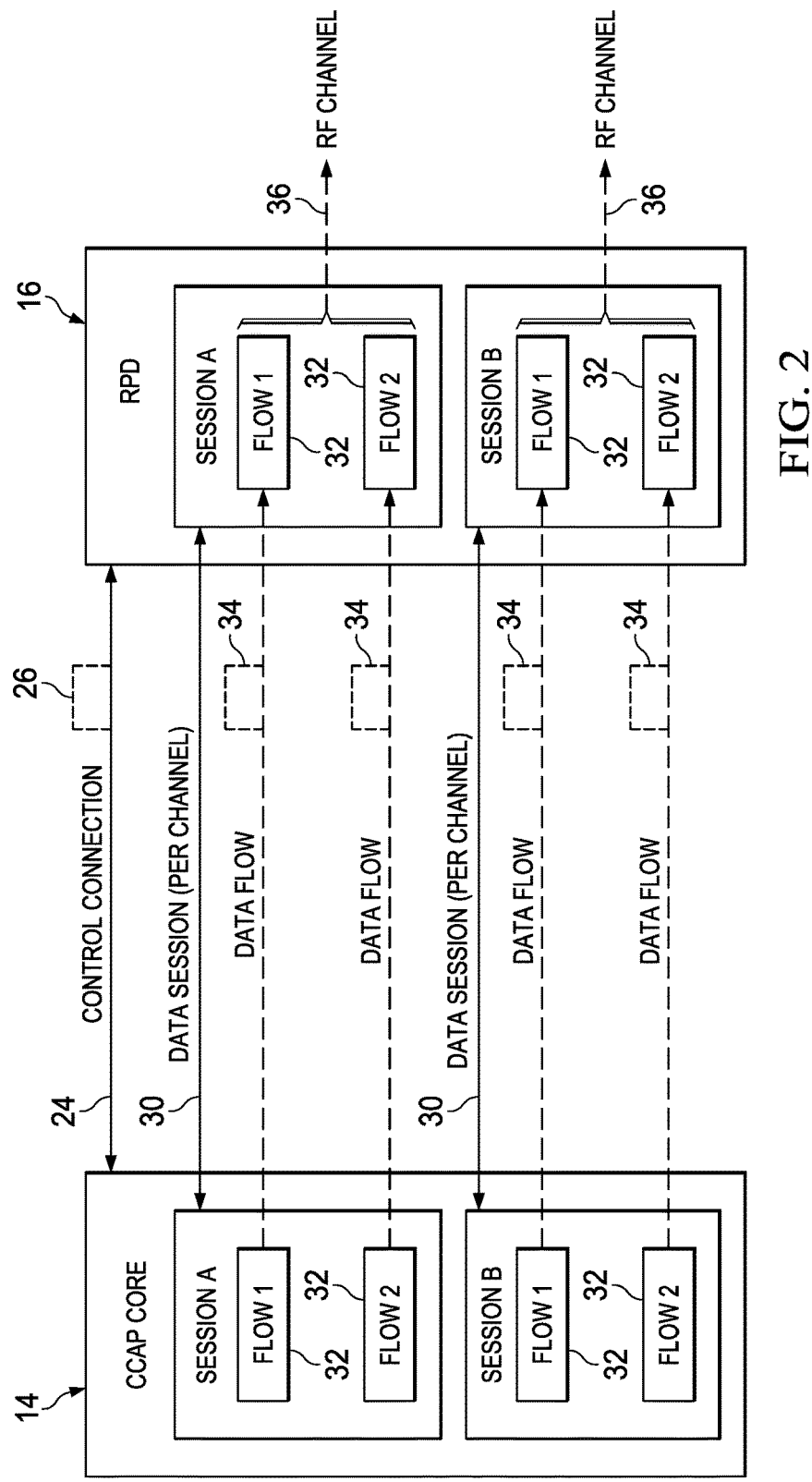
FIG. 2 is a simplified block diagram illustrating example details of embodiments of the communication system.

Turning to FIG. 2, FIG. 2 is a simplified block diagram illustrating an example implementation of communication system 10. A control connection 24, also called a PW tunnel, is established between CCAP-Core 14 and RPD 16. Control connection 24 allows for PW control packets 26 to be sent between CCAP-Core 14 and RPD 16. Typical PW control packets 26 set up more than one data session 30 (e.g., one for each downstream QAM channel) between CCAP-Core 14 and RPD 16. Within the PW tunnel of control connection 24, separate PWs consisting of more than one L2TPv3 data session 30 may be active for each MAC-PHY functional pair. The data plane encapsulation is managed per data session 30. Depending upon the type of PW encapsulation used, a PW may contain one or more channels.

Each data session 30 can be marked with different Differentiated Services Code Points (DSCPs) and can support different encapsulation protocols. Each data session 30 can include one or more data flows 32 for communicating PW data packets. In the example shown in the figure, two sessions, namely, Session A and Session B are shown. Each of Session A and Session B are indicated with two flows, Flow 1 and Flow 2. Any number of sessions and flows therein may be active at any time between CCAP-Core 14 and RPD 16 within the broad scope of the embodiments. Each of data flows 32 comprises PW data packets 34. Each of PW data packets 34 contains a 32-bit session identifier (ID) identifying the specific data session associated with the PW data packet. At RPD 16, PW data packets 34 are decapsulated and converted to the RF domain, and transmitted to CM 18 on respective RF Channels 36.

In many embodiments, PW control packets 26 and PW data packets 34 are substantially identical in format, including number and types of headers, and fields included in respective headers; PW control packets 26 and PW data packets 34 are differentiated based on particular values of fields in respective headers. For example, a session ID field in a L2TPv3 header of PW control packets 26 has zero values for PW control packets 26, and non-zero values for PW data packets 34, differentiating them from each other. Note that PW control packets 26 and PW data packets 34 comprise PW packets, in a general sense. In other words, the term "PW packet" refers to PW control packets 26 and/or PW data packets 34 interchangeably, unless and otherwise specified.

Figure 3:
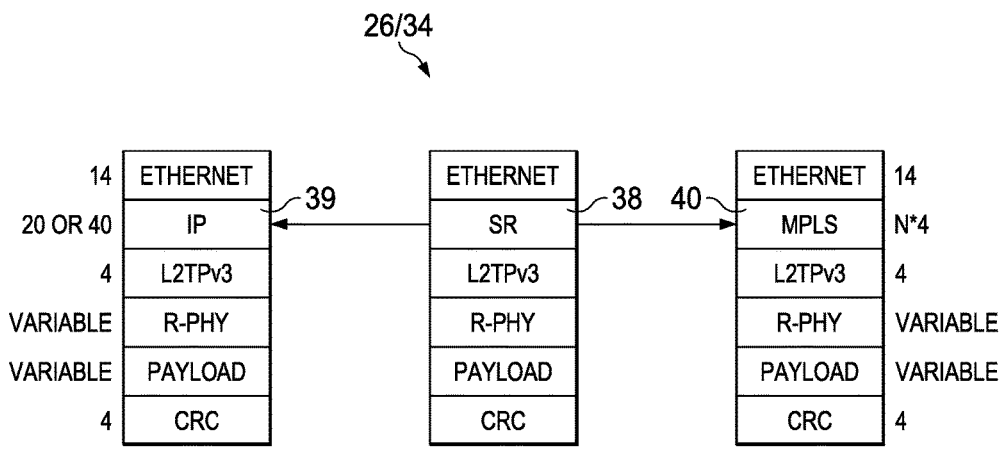
FIG. 3 is a simplified block diagram illustrating other example details of embodiments of the communication system.

Turning to FIG. 3, FIG. 3 is a simplified block diagram illustrating example details of PW packets according to an embodiment of communication system 10. L2TPv3 permits creating a sub-header in the packet headers of PW packets, whose definition is specific to the payload being carried. In a general sense, PW control packets 26 and/or PW data packets 34 may comprise a format as indicated with a plurality of headers. According to an example embodiment, rather than re-implementing DEPI protocols on MPLS and rather than converting the DEPI control plane to MPLS-TE, MPLS can be used as a tunnel underneath the DEPI tunnel. Thus, none of the DEPI signaling is re-written. Rather, the DEPI signaling using L2TPv3 is augmented with new DEPI AVPs added to existing DEPI PW formats that would associate a DEPI/L2TPv3 session with a Segment Routing Segment ID (and header), both to be used with MPLS labels or IPv6 header extensions.

Accordingly, PW control packets 26 and PW data packets 34 comprise the following headers stacked one over the other: Ethernet header; SR header 38; L2TPv3 header; R-PHY header; payload; and cyclic redundancy check (CRC) field. In some embodiments, wherein PW packets are communicated over an IPv6 network, SR header 38 comprises IP header 39; in other words, IP header 39 functions as SR header 38, having appropriate SR related extensions (e.g., fields and values) therein. In some embodiments, wherein PW packets are communicated over an MPLS network, SR header 38 comprises MPLS header 40; in other words, MPLS header 40 functions as SR header 38, having appropriate SR related extensions (e.g., MPLS label stack) therein. Note that PW control packets 26 comprises a DEPI header over L2TPv3 with the PW SID in SR header 38 (e.g., MPLS header 40 or IPv6 header 39); PW data packets 34 comprises a UEPI header over L2TPv3 with the PW SID in its SR header.

Figure 4:
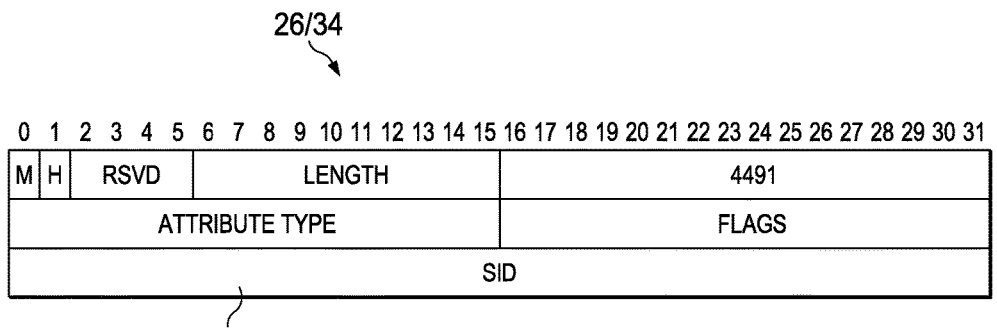
FIG. 4 is a simplified block diagram illustrating yet other example details of embodiments of the communication system.

Turning to FIG. 4, FIG. 4 is a simplified block diagram illustrating example details of PW packets (e.g., PW control packets 26 and/or PW data packets 34) according to an embodiment of communication system 10. An attribute-value-pair (AVP) encodes a PW segment identifier (PW SID) in a SID AVP 42. Flags specify a type of PW SID (e.g., PW SID vs. Label, and Relative vs. Absolute value (PW SID vs. Index)). SID AVP 42 is included in incoming call request (ICRQ), and outgoing call request (OCRQ) messages in some embodiments. SID AVP 42 is bound to a particular one of data session 30. Further, a non-zero value for SID AVP 42 denotes willingness to run SR for that data session 30. In various embodiments, the general header format leverages the CableLabs™ Enterprise Number Vendor ID of 4491 (which may also be used by messages according to GCP).

Alternatively, the PW SID value of SID AVP 42 may indicate binding of data session 30 to a whole tunnel, e.g., comprising one control connection (e.g., session) 24 and multiple data session 30. In yet another embodiment, SID AVP 42 may include a Tunnel PW SID and a Service (Session) PW SID, both advertised over L2TPv3. In yet another embodiment, SR header 38 may comprise a stack of two segments, one segment corresponding to the Tunnel PW SID, and the other segment corresponding to the particular data session PW SID.

Embodiments of communication system 10 provide for SID AVP 42 comprising a new PW Segment (which is also called a Tunnel Segment), which is a different type of segment than typical Node Segment and Adjacency Segment of SR enabled networks. (Node Segment represents a node having global significance in the network, wherein every node in a SR domain installs an MPLS label (or IPV6 address) in the data plane representing the node segment; Adjacency Segment represents a link and has local significance relevant to the nodes directly connected by the link).

The PW Segment Type binds forwarding behavior to an attachment circuit (e.g., attachment circuit comprises the physical or virtual circuit in network 12 attaching CM 18 to CCAP-Core 14). The attachment circuit can comprise a type of L2-Specific Sublayer, unique to DOCSIS PW communication; for example, the attachment circuit comprises a binding (e.g., through appropriate PW mapping in a database) between a specific network segment in network 12 and a particular CM (or group of CMs). The PW Segment Type also includes an adaptation layer specifying characteristics of the attachment circuit, for example, including a segment instruction to map a session ID (of data session 30) to the attachment circuit. Moreover, the PW Segment can be applied within different layers to DEPI, specifically at the L2TPv3 Tunnel or the L2TPv3 Session levels.

In various embodiments, there is no direct integration of SR and DEPI/L2TPv3, because typical SR protocols remove control planes that set up labels (LDP, RSVP), and relies on IGP (OSPF, IS-IS) or BGP to distribute segments, because SR advertises segments in a typical SR enabled network using IGP or BGP. However, there is no IGP or BGP in the context of DEPI or UEPI. SR gets set up before the L2TPv3 control connection. Moreover, discovery and advertisement mechanisms according to embodiments described herein with protocols such as GCP or DEPI (both inherently different to an IGP flooding or a BGP reflector) are different from the mechanisms used with IGP or BGP.

In various embodiments, SR information may be set up with GCP or with DEPI. In an example embodiment, the format as indicated in the figure can be implemented with GCP. This is particularly interesting in the cable use case because network 12 may comprise a Metro Ethernet Network in an access portion and routing protocols may not be normally run. To date, DEPI control plane is used to setup networking related configuration and GCP is used for setting up MAC and PHY related configuration. SR falls somewhere in between GCP and DEPI. GCP can be a good configuration choice because GCP is the general purpose configuration interface. Even longer term with something like WAE, a segment can be bound to an attachment circuit according to some embodiments.

According to some embodiments, communication system 10 implementing the DEPI over MPLS or IPV6 formats includes an ability to advertise (and discover) segments with either GCP or with DEPI, in the absence of IGP or a BGP, using GCP or DEPI to enable both native IPv6 or MPLS SR, as part of an initial configuration negotiation, and an ability to set up a pair of segments on the segment stack using GCP or DEPI. In addition, the method also includes association of Application and PW segments in the stack and allows L2TPv3 native to directly run on top of MPLS. Note that the mechanisms disclosed herein can also be extended to various tunneling types, with DEPI being an example deployment.

Figure 5:
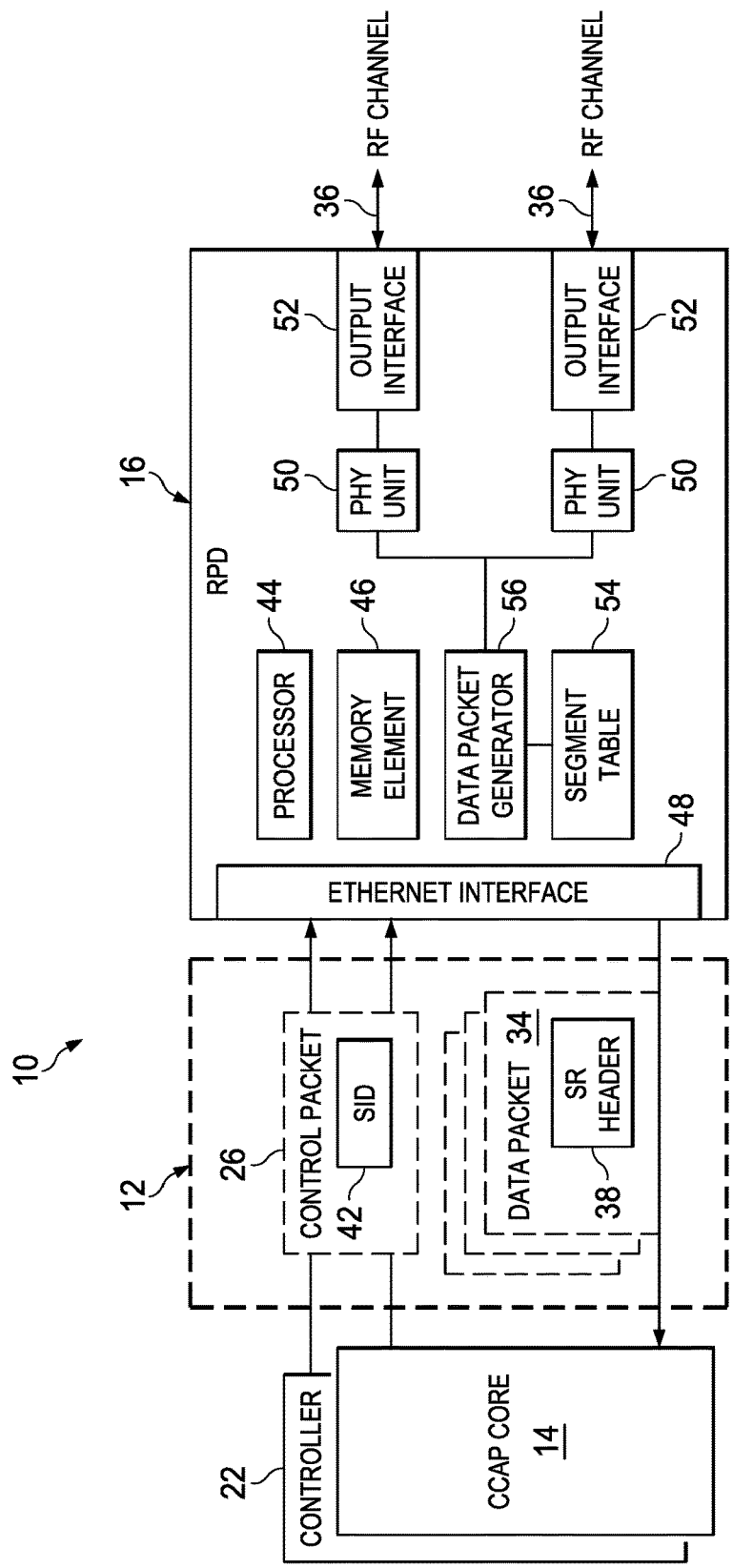
FIG. 5 is a simplified block diagram illustrating yet other example details of embodiments of the communication system.

Turning to FIG. 5, FIG. 5 is a simplified block diagram illustrating example details according to an embodiment of communication system 10. In various embodiments, CCAP-Core 14, or alternatively, controller 22, communicates to RPD 16, PW control packets 26 comprising SID AVP 42 having an appropriate PW Segment identifier (PW SID). The PW SID binds a specific network segment in network 12 to communication between CCAP-Core 14 and one or more CM 18, for example, through specific RF Channels 36. For example, PW SID 1 may bind RF channel 1 to segment S1 in network 12; PW SID 2 may bind RF channel 2 to segment S2 in network 12; and so on.

RPD 16 includes a processor 44, a memory element 46 (both of which may be included in a single central processing unit (CPU) in some embodiments), an Ethernet interface 48, one or more PHY units 50, and one or more output interfaces 52, corresponding to separate RF Channels 36. PW control packets 26 comprising SID AVP 42 is received at RPD 16 over Ethernet interface 48. RPD 16 decapsulates PW control packets 26 and writes the association indicated by SID AVP 42 to a Segment Table 54. Further, data sessions 30 may be established, and other actions according to PW control packets 26 may be performed suitably.

On the upstream side, RF signals are received at Output Interface 52 over coaxial network 20 through RF channel 36. At PHY Unit 50, the received RF signals are digitized, demodulated, and DOCSIS frames are extracted from the Forward Error Correction (FEC) payload. The DOCSIS frames are placed into a suitable UEPI encapsulation corresponding to the data session. A PW data packet Generator 56 looks up Segment Table 54, and generates an appropriate PW header for the received data, including SR header 38, with appropriate values for SID AVP 42. The data is formatted into PW data packets 34 and sent over network 12 to CCAP-Core 14. The communication over network 12 follows segment routing protocols according to the segment information indicated in SR header 38 of PW data packets 34. A clocking circuit manages clocking and timing accuracy for RPD 16. A local CPU comprising processor 44 and memory element 46 manages the DEPI (and UEPI) and Generic Control Plane (GCP) control planes and provides an interface into network management.

On the downstream side, PW data packets 34 arrive from CCAP-Core 14 on Ethernet interface 48. At PHY Unit 50, the DEPI framing is terminated; the PW headers are decapsulated and the payload is extracted. The PW SID from SID AVP 42 is identified. PW data packet Generator 56 looks up Segment Table 54 using the PW SID for appropriate RF parameters associated with the data session mapped to the PW SID. The payload is accordingly suitably modulated, and transmitted out through Output Interface 52.

Figure 6:
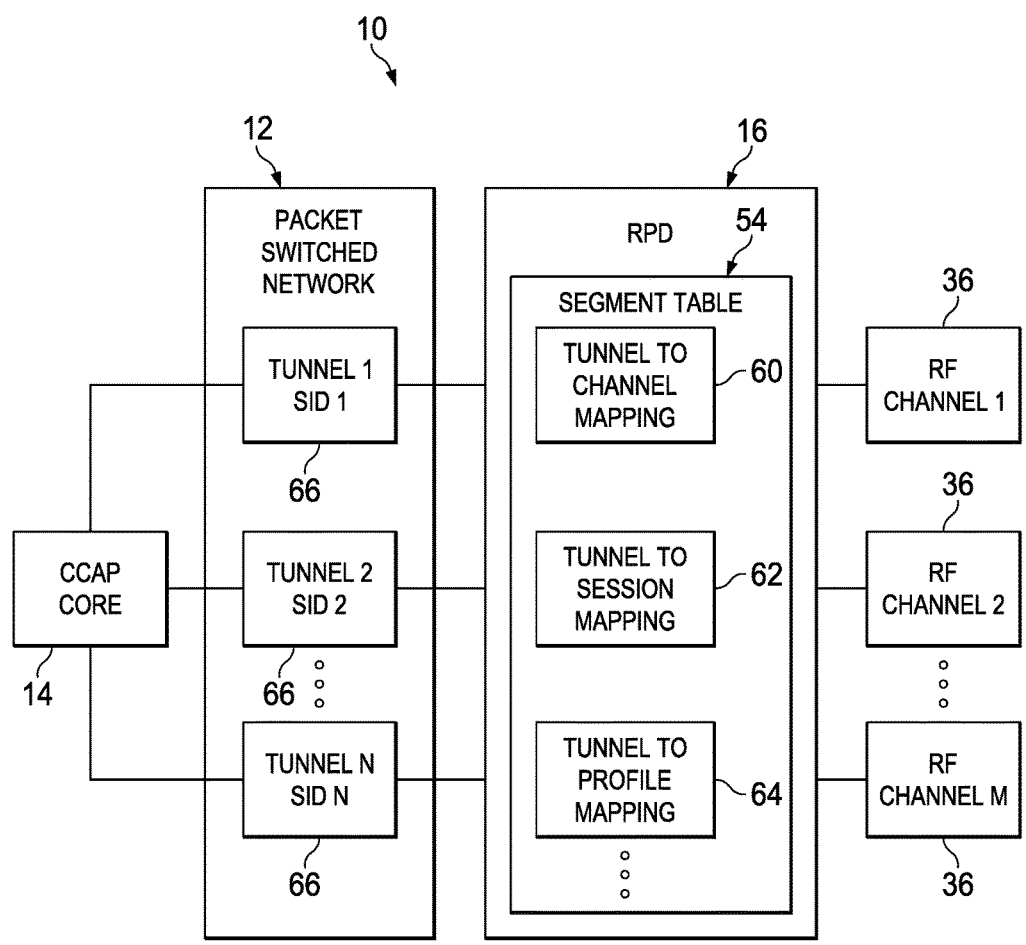
FIG. 6 is a simplified block diagram illustrating yet other example details of embodiments of the communication system.

Turning to FIG. 6, FIG. 6 is a simplified block diagram illustrating example details of mapping according to an embodiment of communication system 10. RPD 16 includes Segment Table 54. In some embodiments, Segment Table 54 includes a tunnel to channel mapping 60; for example, tunnel to channel mapping 60 specifies an association between tunnels and RF Channels (e.g., Tunnel 1 having PW SID 1 mapped to RF Channel 1; Tunnel 2 having PW SID 2 mapped to RF Channel 2; and so no). In some embodiments, Segment Table 54 includes a tunnel to session mapping 62; for example, Tunnel 1 having PW SID 1 mapped to Session A; Tunnel 2 having PW SID 2 mapped to Session B; and so on. In some embodiments, Segment Table 54 includes a tunnel to profile mapping 64; for example, Tunnel 1 having PW SID 1 mapped to Profile A; Tunnel 2 having PW SID 2 mapped to Profile B; and so on. (DOCSIS protocols allow different quality of service and/or modulated communication through different profiles). In a general sense, packet switched network 12 may comprise N tunnels 66 mapped to, or communicating data from (or to) M RF Channels 36. Tunnels 66 route PW packets between CCAP-Core 14 and RPD 16 over network 12.

Figure 7:
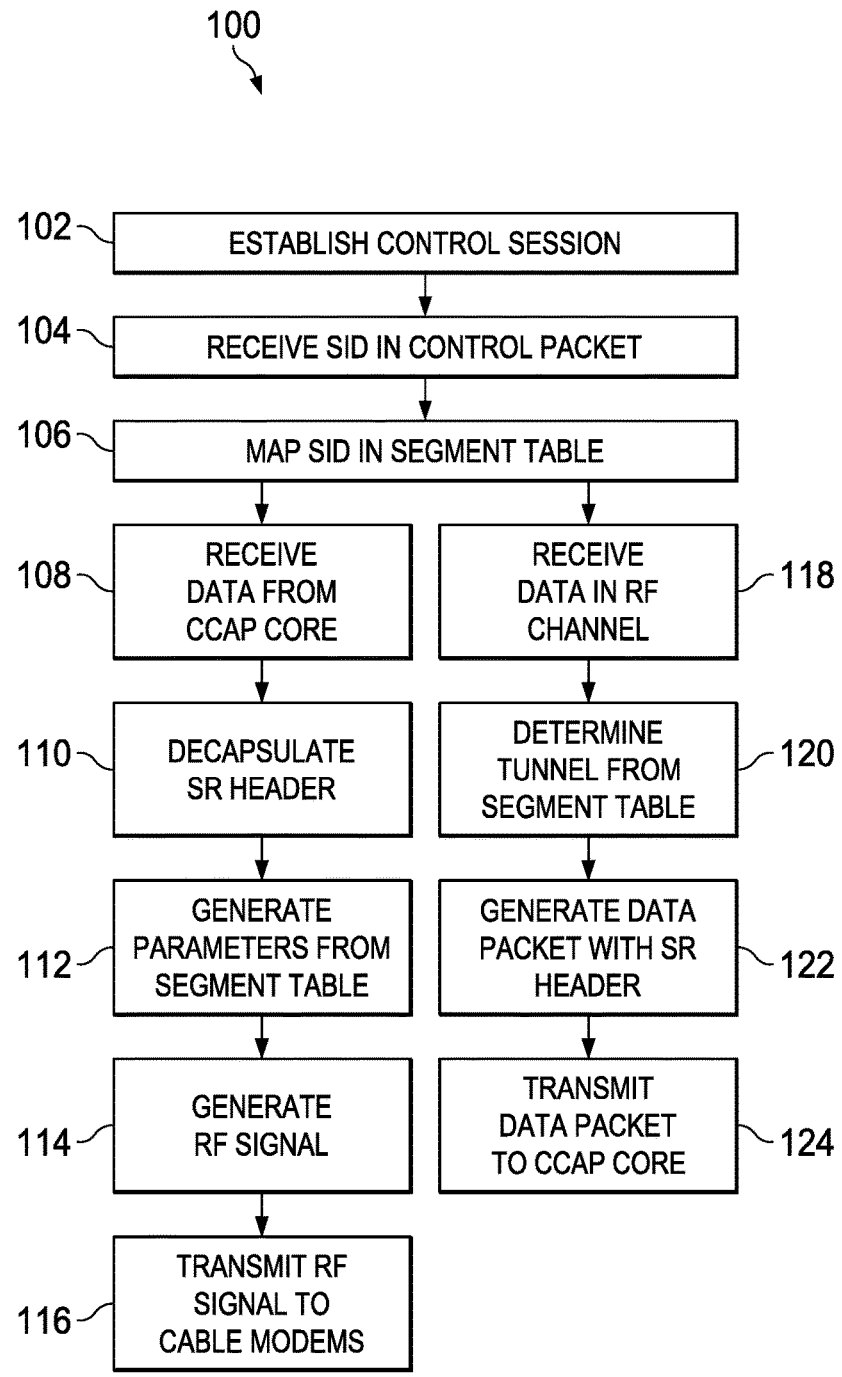
FIG. 7 is a simplified flow diagram illustrating example operations that may be associated with an embodiment of the communication system.

Turning to FIG. 7, FIG. 7 is a simplified flow diagram illustrating example operations 100 that may be associated with embodiments of communication system 10. At 102, control session (e.g., connection) 24 may be established between CCAP-Core 14 (or controller 22) and RPD 16. At 104, PW control packets 26 comprising SID AVP 42 may be received at RPD 16. At 106, the received PW SID may be mapped into Segment Table 106, for example associating a specific tunnel with one of RF Channels 36 according to the mapping indicated in PW control packets 26. Thereafter, data may be received at RPD 16 from CCAP-Core 14 over network 12 and/or CM 18 over RF Channels 36.

Turning to data received from CCAP-Core 14, at 108, data is received at RPD 16 from CCAP-Core 14, for example, in data session 30, in the form of PW data packets 34. At 110, RPD 16 decapsulates headers, including SR header 38 from PW data packets 34. The decapsulating process extracts the PW SID in SR header 38. At 112, RF parameters (e.g., RF Channel, frequencies, etc.) may be determined from information in Segment Table 54 corresponding to the extracted PW SID. At 114, a suitable RF signal incorporating the received DOCSIS data (or video) may be generated and transmitted at 116 to the appropriate cable modem(s) 18.

Turning to data received from cable modem(s) 18, at 118, data may be received over one of RF Channels 36. At 120, the relevant tunnel for the data may be determined from information in Segment Table 54 corresponding to the data type or RF interface (and/or other RF parameters, as appropriate). At 122, PW data packet Generator 56 generates PW data packets 34 with appropriate SR header 38 having the relevant SR information (PW SID, etc.). At 124, PW data packets 34 are transmitted to CCAP-Core 14 over network 12 according to SR protocols.

Note that in this Specification, various components of communication system 10 reference cable networks. However, the operations described herein, and the packet header formats, are applicable in general to many different types of networks. For example, communication system 10 can comprise an Internet of Things (IOT), with RPD 16 comprising one or more "dumb" devices, such as sensors that merely collect data without further processing. For example, RPD 16 comprises a medical sensor that senses a person's pulse and oxygen levels and transmits the data over network 12 to a receiving CCAP-Core 14, comprising a medical information server/database in a hospital. In another example, RPD 16 comprises a barometer that collects atmospheric pressure data and transmits the data over network 12 to a receiving CCAP-Core 14, comprising a weather server. In yet another example, RPD 16 comprises a location sensor that transmits a vehicle's location relative to a geostationary satellite and transmits the data over network 12 to a receiving CCAP-Core 14, comprising a location server/database. In all such examples, it is not necessary that RPD 16 be configured with sophisticated network processors for transmitting the data. According to the various embodiments described herein, the data may be encapsulated in appropriate SR header 38 comprising the SR information of network 12 and communicated over network 12 using simple interfaces and packet generators in RPD 16 using RPD 16's native data communication protocols.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein may be implemented in software. In some embodiments, one or more of these features may be implemented in hardware, provided external to these elements, or consolidated in any appropriate manner to achieve the intended functionality. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, RPD 16 described and shown herein (and/or their associated structures) may also include suitable interfaces for receiving, transmitting, and/or otherwise communicating data or information in any network environment. Additionally, some of the processors and memory elements associated with the various network nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory elements 46) can store data used for the operations described herein. This includes the memory element being able to store instructions (e.g., software, logic, code, etc.) in non-transitory media, such that the instructions are executed to carry out the activities described in this Specification. A processor (e.g., processor 44) can execute any type of instructions associated with the data to achieve the operations detailed herein in this Specification. In one example, processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in the communication system could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, the communication system may be applicable to other exchanges or routing protocols. Moreover, although the communication system has been illustrated with reference to particular elements and operations that facilitate the communication process, these elements, and operations may be replaced by any suitable architecture or process that achieves the intended functionality of the communication system.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
receiving, at a remote physical device (RPD), a pseudowire (PW) control packet comprising segment routing information including a PW segment identifier (PW SID) for establishing a data session between the RPD and a first network element over a packet switched network, the PW SID indicative of a segment in the packet switched network to be used for communicating PW data packets of the data session, the PW control packet and the PW data packets respectively carrying control information and data, and comprising emulations of a point-to-point connection over the packet switched network between the RPD and the first network element;
writing into a segment table of the RPD a mapping between the PW SID and the first data session, wherein the mapping comprises associating a radio frequency parameter and the PW SID;
receiving, at the RPD, data from a second network element, wherein the data is associated with the data session between the RPD and the first network element;
looking up the segment table for the PW SID using information identifying the data session;
generating a PW data packet, comprising a segment routing header having the PW SID; and
transmitting the PW data packet over the packet switched network to the first network element.

2. The method of claim 1, wherein the another network comprises a hybrid fiber coaxial network for radio frequency signals.

3. The method of claim 1, wherein the data session is associated with particular radio frequency parameters for communication between the RPD and the second network element.

4. The method of claim 1, further comprising:
receiving, at the RPD, a PW data packet from the first network element, the PW data packet having the PW SID information in a segment routing header of the PW data packet, the PW data packet comprising data destined to a third network element in another network;
decapsulating the PW data packet;
looking up the segment table using the PW SID for the data session;
generating radio frequency signals comprising the data according to radio frequency parameters of the data session; and
transmitting the radio frequency signals over the another network to the third network element.

5. The method of claim 1, wherein the segment routing information is provided in an attribute value pair (AVP) portion of a header of the PW control packet.

6. The method of claim 1, wherein the first network element comprises a Converged Cable Access Platform (CCAP) Core of a cable network.

7. The method of claim 1, wherein Internet Protocol version 6 (IPv6) protocol is used for communication in the packet switched network, wherein the PW SID comprises a destination IPv6 address identifying the segment.

8. The method of claim 1, wherein Multi-Protocol Label Switching (MPLS) protocol is used for communication in the packet switched network, wherein the PW SID comprises a MPLS label stack identifying the segment.

9. The method of claim 8, wherein the PW control packet comprises a specific combination of a downstream external physical interface (DEPI) header and a Layer 2 Tunneling Protocol Version 3 (L2TPv3) header, wherein the PW SID associates the specific combination with the MPLS label stack.

10. The method of claim 1, wherein the segment routing information comprises another PW SID, wherein the another PW SID is associated with a tunnel between the RPD and the first network element, with multiple data sessions per tunnel.

11. The method of claim 1, wherein the segment routing information is distributed to the RPD without Interior Gateway Protocols and Border Gateway Protocols.

12. The method of claim 1, wherein the segment routing information is distributed to the RPD according to DEPI over L2TPv3.

13. The method of claim 1, wherein the second network element is a cable modem.

14. Non-transitory tangible computer readable media that includes instructions for execution, which when executed by a processor of a RPD, performs operations comprising:
receiving, at the RPD, a PW control packet comprising segment routing information including a PW SID for establishing a data session between the RPD and a first network element over a packet switched network, the PW SID indicative of a segment in the packet switched network to be used for communicating PW data packets of the data session, the PW control packet and the PW data packets respectively carrying control information and data, and comprising emulations of a point-to-point connection over the packet switched network between the RPD and the first network element;

writing into a segment table of the RPD a mapping between the PW SID and the data session, wherein the mapping comprises associating a radio frequency parameter and the PW SID;

receiving, at the RPD, data from a second network element, wherein the data is associated with the data session between the RPD and the first network element, wherein the second network element is a cable modem;

looking up the segment table for the PW SID using information identifying the data session;

generating a PW data packet, comprising a segment routing header having the PW SID; and transmitting the PW data packet over the packet switched network to the first network element.

15. The media of claim 14, the operations further comprising:

receiving, at the RPD, a PW data packet from the network element, the PW data packet having the PW SID information in a segment routing header of the PW data packet, the PW data packet comprising data destined to a third network element in another network;

decapsulating the PW data packet;

looking up the segment table using the PW SID for the data session;

generating radio frequency signals comprising the data according to radio frequency parameters of the data session; and transmitting the radio frequency signals over the another network to the third network element.

16. The media of claim 14, wherein the first network element comprises a CCAP-Core of a cable network.

17. An apparatus, comprising:

a memory element for storing data; and a processor, wherein the processor executes instructions associated with the data, wherein the processor and the memory element cooperate, such that the apparatus is configured for:

receiving, at the apparatus, a PW control packet comprising segment routing information including a PW SID for establishing a data session between the RPD and a first network element over a packet switched network, the PW SID indicative of a segment in the packet switched network to be used for communicating PW data packets of the data session, the PW control packet and the PW data packets respectively carrying control information and data, and comprising emulations of a point-to-point connection over the packet switched network between the RPD and the first network element;

writing into a segment table of the apparatus a mapping between the PW SID and the data session, wherein the mapping comprises associating a radio frequency parameter and the PW SID;

receiving, at the RPD, data from a second network element, wherein the data is associated with the data session between the RPD and the first network element;

looking up the segment table for the PW SID using information identifying the data session;

generating a PW data packet, comprising a segment routing header having the PW SID; and transmitting the PW data packet over the packet switched network to the first network element.

18. The apparatus of claim 17, wherein the apparatus is further configured for:

receiving, at the apparatus, data from another network element over another network, wherein the data is associated with the data session between the apparatus and the network element;

looking up the segment table for the PW SID using information identifying the data session;

generating a PW data packet, comprising a segment routing header having the PW SID; and transmitting the PW data packet over the packet switched network to the network element.

19. The apparatus of claim 17, wherein the apparatus is further configured for:

receiving, at the apparatus, a PW data packet from the first network element, the PW data packet having the PW SID information in a segment routing header of the PW data packet, the PW data packet comprising data destined to a third network element in another network;

decapsulating the PW data packet; looking up the segment table using the PW SID for the data session;

generating radio frequency signals comprising the data according to radio frequency parameters of the data session; and transmitting the radio frequency signals over the another network to the third network element.

20. The apparatus of claim 17, wherein the second network element is a cable modem.

* * * * *